United States Patent [19]

Gratzer et al.

[11] 4,449,682

[45] May 22, 1984

[54] AERODYNAMICALLY CONTOURED, LOW DRAG WING, ENGINE AND ENGINE NACELLE COMBINATION

[75] Inventors: Louis B. Gratzer, Seattle; Walter B. Gillette, Issaquah, both of Wash.

[73] Assignee: The Boeing Company, Seattle, Wash.

[21] Appl. No.: 218,829

[22] Filed: Dec. 22, 1980

Related U.S. Application Data

[63] Continuation of Ser. No. 698, Jan. 3, 1979, abandoned.

[51] Int. Cl.² ............................................. B64D 29/02
[52] U.S. Cl. .................................... 244/130; 244/55; 244/53 R
[58] Field of Search ................... 244/53 R, 54, 55, 130

[56] References Cited

U.S. PATENT DOCUMENTS

| | | | |
|---|---|---|---|
| 3,199,813 | 8/1965 | Roper | 244/130 |
| 3,658,279 | 4/1972 | Robertson | 244/53 R |
| 3,799,476 | 3/1974 | Bouiller et al. | 244/53 R |

OTHER PUBLICATIONS

Goodmanson et al., "Recent Advances . . . for Transport Aircraft", AIAA 9th Annual Meeting, Jan. 8–10, 1973, p. 11.

Wells et al., "Wind Tunnel . . . Investigation of Over-The-Wing Propulsion/Air Frame Interferences for a Shorthaul Aircraft . . . ", NASA Contractor Report CR-2905, Sep. 1977, p. 24.

*Primary Examiner*—Charles E. Frankfort
*Attorney, Agent, or Firm*—Hughes, Barnard & Cassidy

[57] ABSTRACT

A nacelle mounted directly to and below a wing so as to extend forwardly therefrom. The wing has a critical zone, which includes an area in the airstream flow about the wing where either of the following conditions occur:

1. The local pressure coefficient in the airstream has an absolute magnitude greater than 0.05,
2. The airstream flow about the airfoil is supersonic.

The nacelle has a critical surface region which is a side surface portion of the nacelle adjacent to a forwardly swept portion of the wing. The critical contour area of the nacelle surface is that portion of the critical surface region that is within the critical zone. The critical contour area of the nacelle is shaped to be in alignment with a plurality of airfoil streamlines that are immediately adjacent the critical contour area. Other surface portions of the nacelle are out of alignment with adjacent streamlines and correspond more closely to the engine structure contour.

14 Claims, 13 Drawing Figures

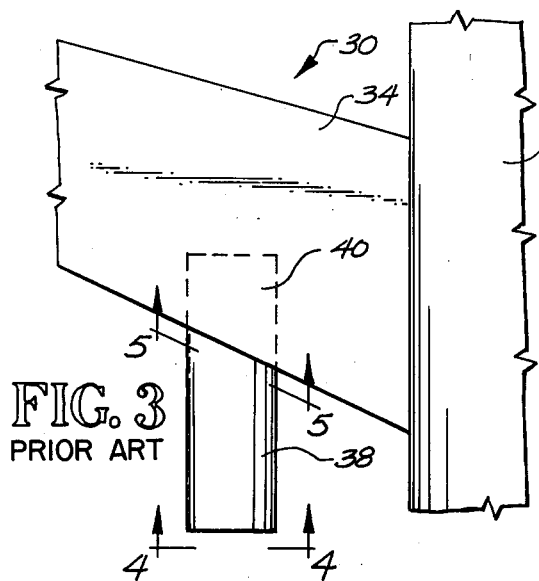
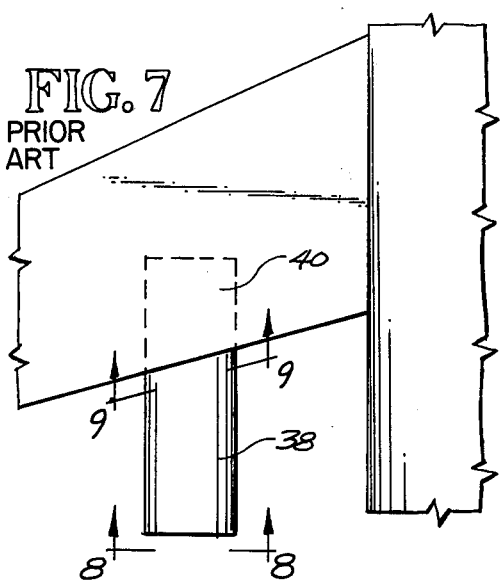
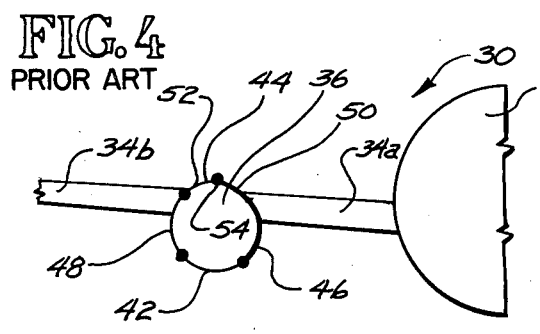
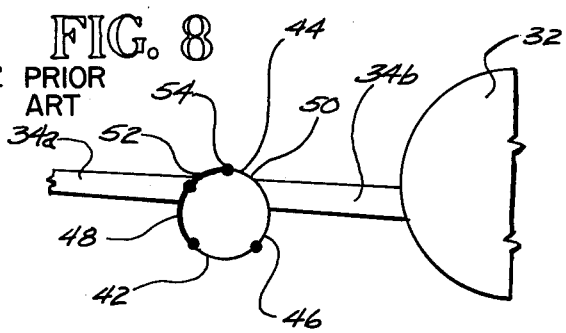
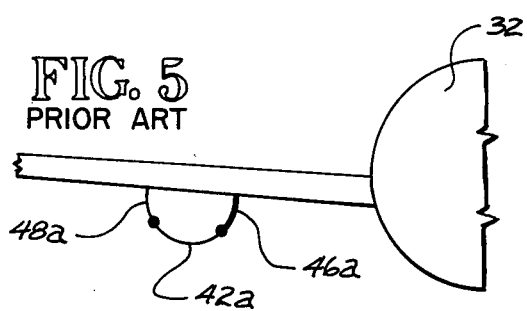
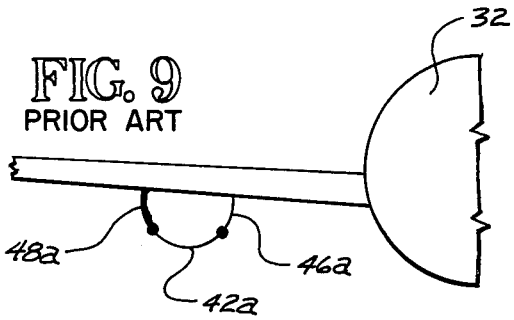
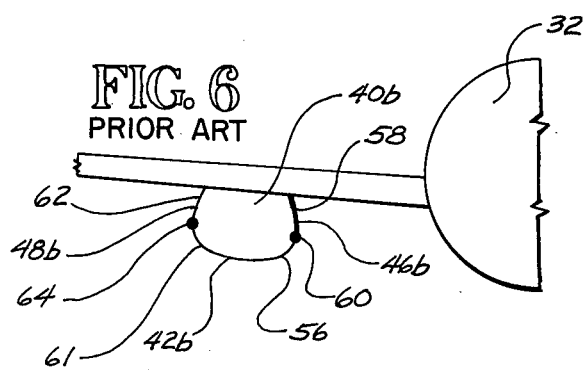
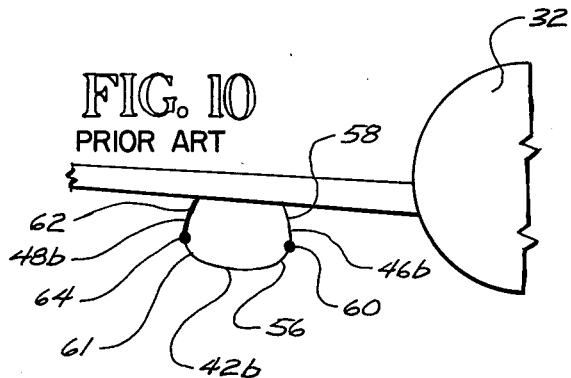

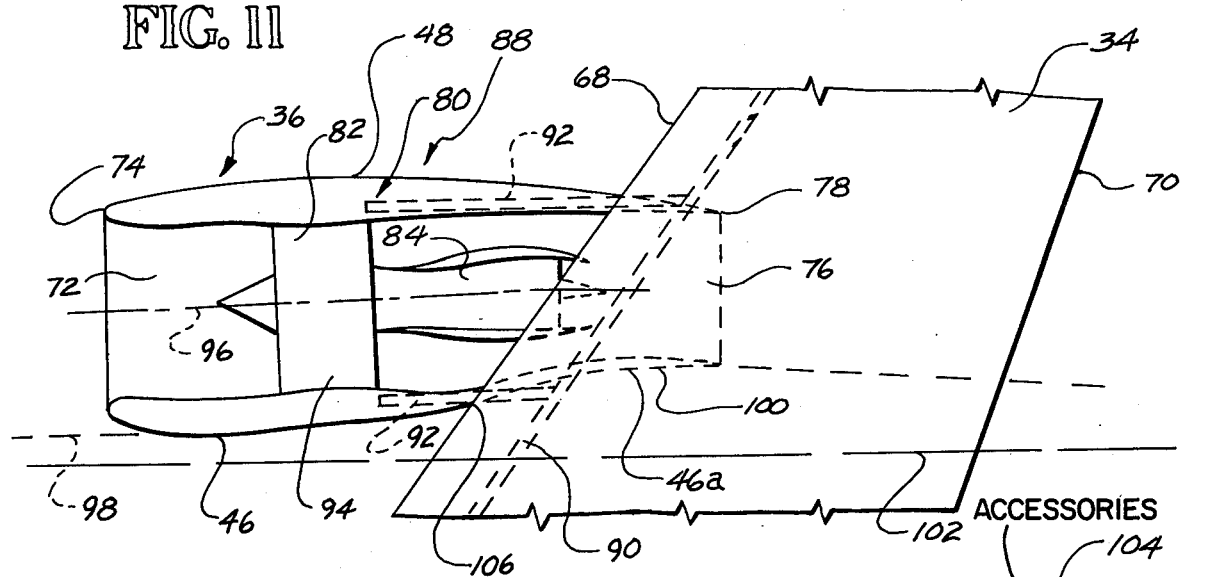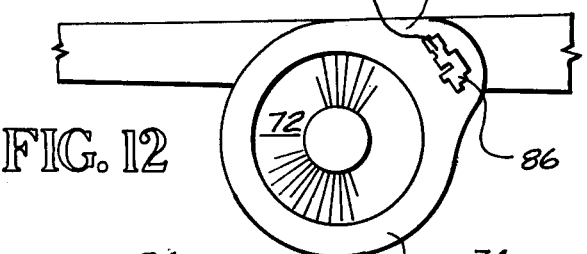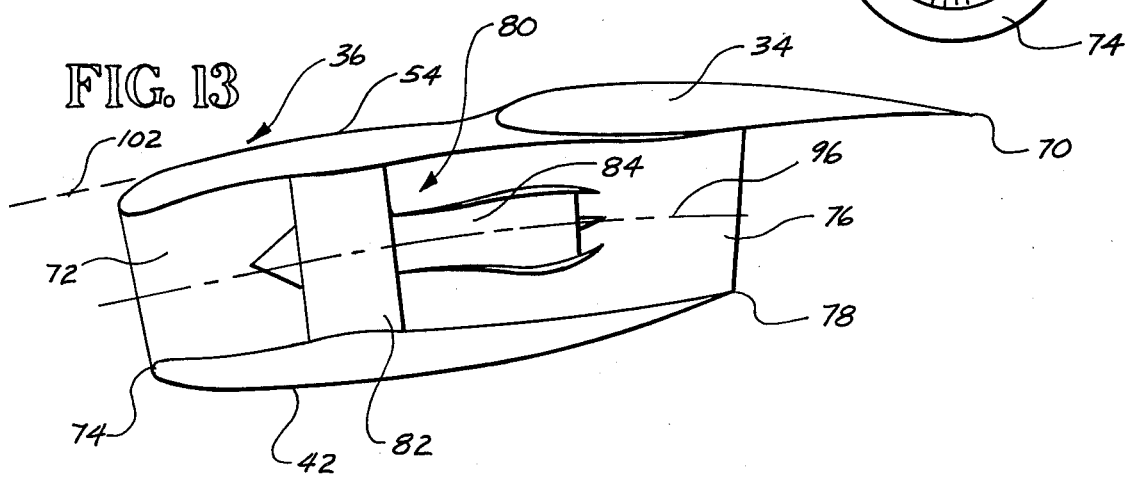

AERODYNAMICALLY CONTOURED, LOW DRAG WING, ENGINE AND ENGINE NACELLE COMBINATION

CROSS REFERENCE TO RELATED APPLICATIONS

This application is a continuation of U.S. patent application Ser. No. 000,698, filed Jan. 3, 1979, and now abandoned. Further, this application is related to three other U.S. patent applications, which were filed concurrently herewith and are by the same inventors as the present application, these related applications being Ser. Nos. 218,847, 218,737 and 218,738.

BACKGROUND OF THE INVENTION

The present invention relates to an airfoil, engine and engine nacelle combination, where the aerodynamic contours are such as to properly accommodate the engine and approach minimum drag.

It has long been known that aerodynamic interference drag can be alleviated by contouring an object so that its surface lies as nearly as possible along streamlines generated by adjacent aerodynamic objects. With regard to a nacelle mounted directly to a wing, an idealized configuration would be such that the nacelle is "hidden" aerodynamically from the adjacent wing by shaping the nacelle so that it lies entirely along streamlines generated by the wing. In this case, the nacelle would be "invisible" to the wing and thus no interference would occur. This is a well understood concept of aerodynamics and has been disclosed in various publications (e.g. (a) Report No. NASA CR-2905, dated September 1977, entitled "Wind Tunnel and Analytical Investigation of Over-the-Wing Propulsion/Air Frame Interference For A Short Haul Aircraft at Mach Numbers from 0.6 to 0.78.) (b) AIAA Paper Number 73-9, entitled "Recent Advances in Aerodynamics for Transport Aircraft", by L. T. Goodmanson and L. B. Gratzer.

In order to meet this requirement, the nacelle would lie along a stream tube of the air passing adjacent the wing, and the volume of the nacelle would be determined entirely by that available within the stream tube. With regard to a nacelle containing an engine this ideal nacelle is not practical for a number of reasons. Among the more important reasons are the following. First, the nacelle cross-sectional area at its main control portion is substantially larger than at its inlet or outlet area, because of the turbine machinery, the nacelle structure and accessory gear boxes. Also, the inlet stream tube tends to expand as it nears the inlet. Another consideration is that the engine exhaust tends to change shape after it leaves the exit nozzle and generally has a different area than the stream tube that it is replacing.

Thus in actual practice a nacelle must depart in some manner from the ideal geometry which would produce no interference with the adjacent airstream. It is an object of this invention to provide a wing, engine, and engine nacelle combination arranged in a manner that each performs its intended function and with the overall combination being arranged in such a manner as to minimize drag.

In a search of the patent literature, there was disclosed a U.S. Pat. No. 3,199,813, Roper, which relates to contouring a pod mounted to an outboard end of a swept wing. That portion of the pod which is either directly above or directly below the wing is contoured so as to follow the two-dimensional flow patterns of the airstream flowing directly over or directly under the wing. While the Roper patent does represent an advance in the state of the art at that time, to the best knowledge of the applicants, the teaching in Roper is not adequate to provide a full understanding of the principles necessary to arrive at the present invention.

The other patents noted in the patentability search are representative of various aerodynamic shapes. A review of these patents indicate that to the best knowledge of the applicants herein these are not particularly relevant to the present invention. However, these are disclosed herein to ensure that the applicants are fully complying with their duty of disclosing to the Patent Office all prior art of possible relevance.

U.S. Pat. No. 1,813,645, Townsend
U.S. Pat. No. 2,090,775, Wright
U.S. Pat. No. 2,207,242, Seversky
U.S. Pat. No. 2,576,981, Vogt
U.S. Pat. No. 2,649,266, Darrieus
U.S. Pat. No. 2,874,922, Whitcomb
U.S. Pat. No. 2,898,059, Whitcomb
U.S. Pat. No. 2,927,749, Brownell
U.S. Pat. No. 2,984,439, Fletcher
U.S. Pat. No. 3,129,906, Peterson
U.S. Pat. No. 3,229,933, Kutney
U.S. Pat. No. 3,237,981, Wotton
U.S. Pat. No. 3,369,775, Rethorst
U.S. Pat. No. 3,448,945, Ascani, Jr.
U.S. Pat. No. 3,455,523, Hertel
U.S. Pat. No. 3,476,336, Hertel
U.S. Pat. No. 3,519,227, Brooks
U.S. Pat. No. 3,533,237, Rabone et al
U.S. Pat. No. 3,606,213, Lubimov
U.S. Pat. No. 3,727,862, Kaufhold et al
U.S. Pat. No. 3,776,489, Wen et al
U.S. Pat. No. 3,806,067, Kutney
U.S. Pat. No. 3,960,345, Lippert, Jr.
U.S. Pat. No. 3,968,946, Cole

SUMMARY OF THE INVENTION

The present invention is a combination of an airfoil, engine and engine nacelle designed for an aircraft having a londitudinal axis and designed for flight at a predetermined design speed through a main airstream having a main flow direction.

The combination comprises an airfoil having a leading edge, a trailing edge, and a lower aerodynamic surface, said airfoil having a predetermined sweep angle of at least 10° and having an outboard end and an inboard end. There is a nacelle mounted directly adjacent to the airfoil at a location below and forwardly of the airfoil. The nacelle has a forward section extending forwardly of the leading edge and a rear section positioned rearwardly of the leading edge; the nacelle has an inboard side surface portion and an outboard side surface portion. An engine is mounted in the nacelle.

The airfoil is characterized that in a situation where the airfoil would be passing in flight through the airstream at design speed, without the nacelle being near the airfoil, the airfoil creates in the airstream an airstream flow pattern having a plurality of streamlines which approach the leading edge and pass over the airfoil. The airfoil creates in the airstream flow pattern a critical zone. This zone includes a general area in the airstream flow proximate said airfoil, where either of the following conditions occur:

1. a local pressure coefficient in the airstream flow has an absolute magnitude greater than 0.05,
2. the airstream flow about the airfoil is supersonic.

The nacelle has a critical surface region which comprises the nacelle side surface portion adjacent an airfoil portion that sweeps laterally and forwardly from the nacelle. The nacelle has a critical contour area which comprises an area where any portion of the critical surface region is within the critical zone.

The critical contour area of the nacelle is in substantial contour alignment with the streamlines immediately adjacent the critical contour area. The critical contour area has a forward portion forward of the leading edge and sloping rearwardly in a lateral direction slanted from the main flow direction in a direction of rearward sweep of the airfoil. The critical contour area has a rear portion rearward of the leading edge sloping rearwardly in a lateral direction from the main flow direction also in the direction of rearward sweep of the airfoil.

Other nacelle surface portions which are not included in the critical contour area are collectively considered as a non-critical contour area. The non-critical contour area has at least a substantial portion thereof shaped to conform to configuration requirements of the engine, with at least part of the substantial portion of the non-critical contour area departing from substantial contour alignment with adjacent streamlines.

In the preferred form, the nacelle has an inlet end, an outlet end and a main body portion intermediate the inlet and outlet ends. The outlet end has a cross sectional area smaller than that of the main body portion, and at least a portion of the non-critical contour area is arranged to slope from said main body portion rearwardly to the outlet end on a slant toward a longitudinal center line of the nacelle.

In the preferred form, the critical contour area is aligned within a tolerance to satisfy the following formula:

$$\frac{|h|}{\sqrt{\frac{A_\pi}{\pi}}} < \text{the alignment tolerance value}$$

"h" = the distance between point of reference and most adjacent point.
$A_\pi$ = cross sectional area of nacelle at most adjacent point
where the following definitions apply:

a. "point of reference" is any point on the stream sheet in the critical contour area,
b. "most adjacent point" is any point on the nacelle nearest to the point of reference,
c. $A_\pi$ is a frontal area of the nacelle measured in a plane which contains the most adjacent point and is perpendicular to free stream direction.

The broader range of the tolerance value is a value no greater than about 0.2. A more preferred range is no greater than about 0.15, with the most preferred range being a tolerance value of no greater than about 0.1.

The curvature of the critical contour area should be within a tolerance to satisfy the following formula:

$$\left(\frac{M}{M_\infty}\right)^2 \left(\sqrt{\frac{A_\pi}{\pi}}\right) \left|\frac{1}{R_{S.S.}} - \frac{1}{R_N}\right| < \text{contour tolerance value}$$

where the following definitions apply:
M = Mach number on the stream sheet at the point of reference.
$M_\infty$ = free stream Mach number at infinity.
$R_{S.S.}$ = radius of curvature of stream sheet at point of reference.
$R_N$ = radius of curvature of nacelle at most adjacent point.

where the radius of curvature of either the stream sheet at the point of reference or the nacelle at the most adjacent point is measured in a plane which contains the surface normal at the point and the local velocity vector at the point. The broader limit of the contour value is 0.15, an intermediate value 0.1, and the preferred value 0.05.

In the preferred form, the engine comprises a turbo fan engine having a fan section and a core engine. The engine has engine accessories located adjacent the fan section within the nacelle at a location adjacent the forward portion of the critical contour area of the nacelle. Desirably the nacelle has at an upper forward portion of the critical contour area a protuberance aligned with the stream sheet and the engine accessories are located in the protuberance.

Preferably the critical contour region also comprises an upper surface portion of the nacelle forward section, which upper surface portion is adjacent to the nacelle side surface portion which comprises the critical contour area. The rear part of the side surface portion which comprises the critical surface region and is positioned above the wing includes an area which is the larger of the following:
(a) that portion of the rear part of the side surface portion which comprises a one-quarter perimeter portion of an entire circumference of the nacelle rear section
(b) that portion of the rear part of the side surface portion which extends from the airfoil to a location of maximum horizontal diameter of the nacelle rear section.

Other features will become apparent from the following detailed description.

BRIEF DESCRIPTION OF THE DRAWING

FIG. 3 is a semi-schematic top plan view showing an aircraft with a rearwardly swept wing, having an engine directly mounted thereto so as to be above and forward of the wing;

FIG. 4 is a front view of the engine and aircraft of FIG. 3;

FIG. 5 is a sectional view taken along line 5—5 of FIG. 3;

FIG. 6 is a view similar to FIG. 5, but showing a different configuration of the nacelle portion above the wing;

FIGS. 7 through 10 are figures similar to FIGS. 3 through 6, but showing the nacelle mounted to a forward swept wing;

FIG. 11 is a top plan view of an engine nacelle, with the top portion thereof broken away to display the engine therein, mounted to a rearwardly swept wing and incorporating teachings of the present invention;

FIG. 12 is a front elevational view of the nacelle of FIG. 11;

FIG. 13 is a side elevational view of the nacelle of FIG. 11, with an inboard side portion thereof broken away.

DETAILED DESCRIPTION OF THE PREFERRED EMBODIMENTS

It is believed that a clearer understanding of the present invention will be achieved by presenting first the analytical considerations which are basic to the present invention, and then describing the apparatus of the present invention.

As a first step in defining the apparatus of the present invention, there is a determination of what is called the "critical zone" of the airfoil to which a nacelle is mounted. When an airfoil passes through the air, it generates streamlines in the main stream flow which bend around the airfoil. The result of this is that the air that flows around the airfoil experiences changes in both pressure and velocity.

The critical zone is that area which includes any point around the airfoil where either of the following conditions occur:

1. the local pressure coefficient in the air stream flow has an absolute magnitude greater than 0.05.
2. the local airstream flow around the airfoil is supersonic.

Figure 1:
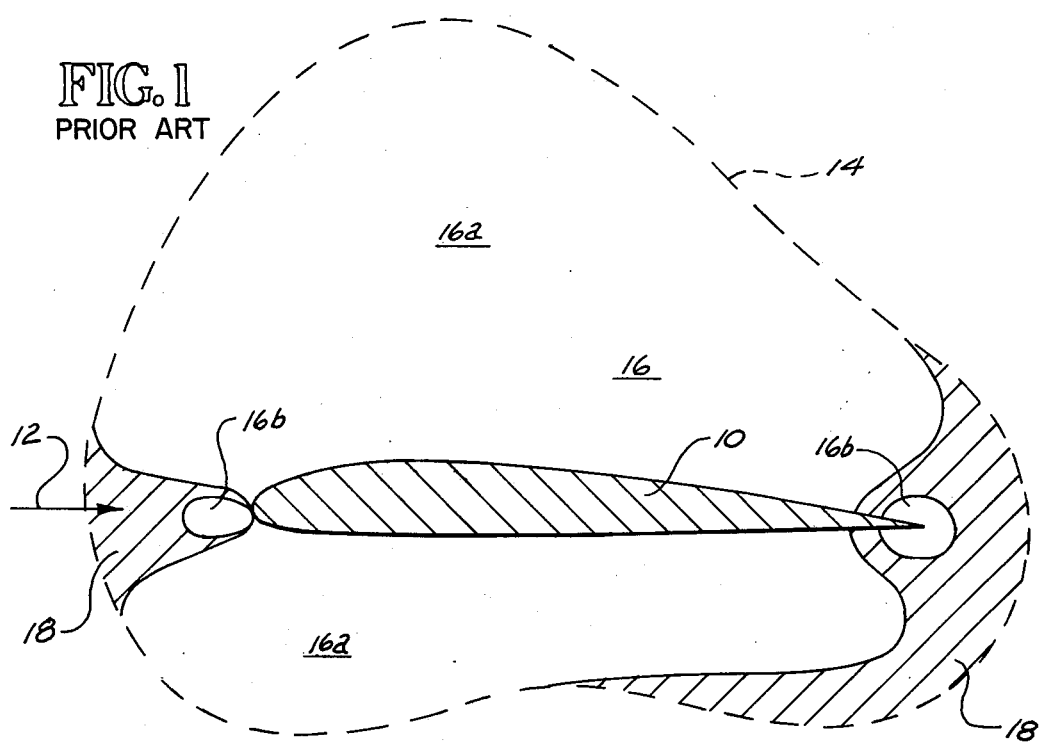
FIG. 1 is a schematic drawing of an airfoil outlining a typical "critical zone" of the airfoil, which can be related to a pressure coefficient characterising its outer bounds.

Reference is made to FIG. 1 which shows in chordwise section a typical airfoil 10 moving relative to a main stream of air indicated by the arrow 12, at a Mach number of about 0.8. (As used herein, the term "airfoil" is used in its broader sense to denote a wing-like structure that generates lift.) There is a broken line 14 surrounding the airfoil 10, and this line 14 encloses a general area 16 where the absolute magnitude of the local pressure coefficient exceeds 0.05. As used herein, the term "pressure coefficient" can be defined according to the following formula:

$$C_p = (P - P_\infty)/q_\infty$$

where:
P = static pressure at any location
$P_\infty$ = static pressure in the airstream at infinity
$Q_\infty$ = dynamic pressure in the airstream at infinity Within the larger area 16, there are "imbedded zones" which are indentations within the zone 16, where the absolute magnitude of Cp is less than 0.05, but where the air is experiencing a relatively rapid change in velocity. These imbedded zones are indicated at 18 in FIG. 1 and shown as shaded. Within the broader definition of the "critical zone", it is intended that the critical zone should include these imbedded regions 18 which are within the zone 16. The areas within the zone 16 which have a Cp lower than minus 0.05 are indicated at 16a, and those which have a Cp higher than plus 0.05 are indicated at 16b.

Figure 2:
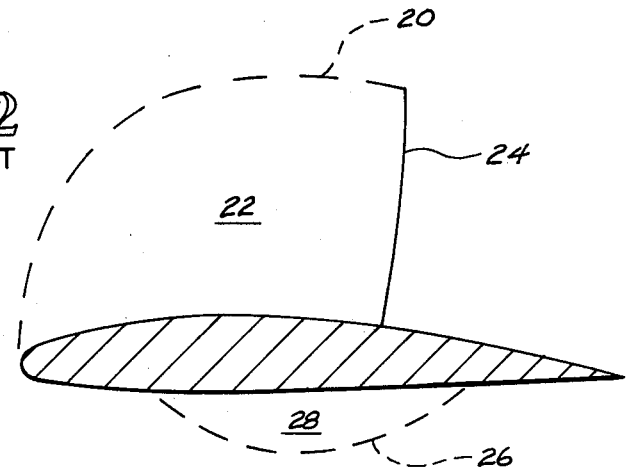
FIG. 2 is a second schematic drawing of an airfoil showing a typical portion of the "critical zone" as it relates to areas of supersonic flow over an airfoil.

With regard to the second criterion to define the critical zone (i.e. where the flow above the airfoil is supersonic), reference is made to FIG. 2. There is an upper broken line 20, enclosing an area 22 where the flow above the airfoil 10 becomes supersonic. This area 22 is defined at its rear portion by a line 24 representing a shock wave where the flow over the airfoil turns subsonic. There is a second broken line 26, defining an area 28 below the airfoil 10, where the flow is also supersonic.

The definition of the two criterion for the critical zone can be achieved in any number of ways well known to the aerodynamicist. For example, these could be obtained experimentally by testing the airfoil in a wind tunnel. Further there are analytical procedures by which these perimeters can be determined. The second consideration in defining the apparatus of the present invention is to define a "critical surface region" of a nacelle which is to be pylon mounted to the wing of the aircraft. With reference to FIGS. 3–6, there is shown an aircraft 30 having a fuselage 32, a rearwardly swept wing 34, and a longitudinally aligned nacelle 36, mounted directly to the wing 34 so as to be positioned below and forward of the wing 34.

The nacelle 36 can be considered as having a forward portion 38 extending forwardly of the wing 34, and a rear portion 40 positioned below the wing 34. With reference to FIG. 4, the forward portion 38 of the nacelle 36 can be considered as having a lower surface 42, an upper surface 44, an inboard side surface 46 and an outboard side surface 48. As an approximation, each of the surfaces 42–48 can be considered as comprising about a 90° portion of the periphery of the surface of the nacelle forward portion 38. The upper surface portion 44 can be considered as being made up of inboard and outboard upper surface portions 50 and 52, separated by an upper surface center line 54 dividing the upper surface 44.

With regard to the rear nacelle portion 40 (i.e. that portion of the nacelle 36 positioned directly below the wing 34), reference is made to FIG. 5 which shows this rear nacelle portion as having a generally semi-cylindrical configuration This rear nacelle portion 40 can be considered as having a lower surface 42a which is a rearward extension of the lower surface 42 of the nacelle forward portion 38, and two side surfaces, namely an inboard side surface 46a and an outboard side surface 48a. With the rear nacelle surface portion 40 having a cross-sectional configuration which is generally semi-cylindrical, the lower surface 42a comprises about half of the total surface area of the rear nacelle surface portion 40, and the side surfaces 46a and 48a about a quarter each of the total surface area.

FIG. 6 shows a somewhat modified configuration where the rear nacelle portion 40 is positioned further below the wing 34 so that the perimeter of the total surface area of the rear nacelle portion 40 is greater than a semi-cylindrical. To distinguish this from the configuration shown in FIG. 5, the rear nacelle surface portion in FIG. 6 is designated 40b. This rear nacelle portion 40b can be considered as having a lower surface 42b which is a rearward continuation of the surface 42 of the nacelle forward portion 38, and two side surfaces, namely an inboard surface 46b and an outboard surface 48b. The inboard surface 46b can in turn be considered as being made up of lower and upper side surface portions 56 and 58, respectively, these surface portions 56 and 58 being divided by an inboard side center line 60.

In like manner, the outboard surface 48b can be considered as being made up of lower and upper surface portions 61 and 62, respectively, these surface portions 60 and 62 being divided by an outboard side center line 64. The inboard and outboard side center lines 60 and 64 are located at the location of the maximum horizontal diameter of the rear nacelle portion 40b.

With the wing 34 being swept rearwardly, with respect to the location of the nacelle 36, the wing 34 can be considered as having two portions, namely: (a) a forwardly swept portion 34a which extends laterally and forwardly from the nacelle 36, (b) a rearwardly swept portion 34b extending laterally and rearwardly from the location of the nacelle 36.

The next consideration is to define the "critical surface region" of the nacelle 36. This critical surface region can be considered as including the following surface areas. With regard to the nacelle forward portion 38 (i.e. that portion of the nacelle positioned forwardly of the wing 34), the critical surface region is considered as the side surface of the nacelle 36 which is adjacent the forwardly swept portion of the wing 34. In the configuration of FIGS. 3 and 4 where the total wing 34 is swept rearwardly from the fuselage 32, the critical surface region becomes the inboard surface 46. In addition, the upper surface portion which is adjacent the forwardly swept portion of the wing 34 can be considered a part of the critical surface region in those instances where the nacelle 36 is mounted so that the upper surface portion 50 is quite close to the lower surface of the wing 34. Thus, with the rear swept configuration of FIGS. 3 and 4, the upper inboard surface portion (50) can be considered as being part of the critical surface region.

To define the critical surface region with regard to the rear nacelle portion 40, the critical surface region can be considered as including the side surface adjacent the forwardly swept portion of the wing, which includes the greater of the following defined areas:

a. that portion of the side surface of the rear portion of the nacelle which comprises a one-quarter perimeter portion of the entire circumference of the rear portion of the nacelle surface b. that portion of the side surface of the nacelle which extends from the wing surface to the location of the maximum horizontal diameter of the nacelle rear portion 40.

To apply this specifically to the configuration in FIGS. 5 and 6, reference is first made to FIG. 5. In FIG. 5, the inboard surface portion 46a comprises approximately one-quarter of the total perimeter surface area of the nacelle rear portion 40. Thus, the first criterion noted directly above would apply. Since the location of the maximum diameter is at the wing surface, the second criterion would not apply, and the critical surface region thus becomes the inboard side surface portion 46a.

To apply this same analysis to the nacelle configuration of FIG. 6, consideration is first given to the second criterion (the side surface portion extending from the wing lower surface to the location of the maximum horizontal diameter). It is readily apparent that by applying this criterion the upper side surface portion 58 would be included in the critical surface region. With regard to the surface area below the side center line 60, the critical surface region may or may not extend below this line 60, depending upon whether the upper side surface portion 58 made up less than one-quarter of the total perimeter surface area of the nacelle rear portion 40. If the side surface portion 58 made up at least a quarter of the total nacelle perimeter area at the rear portion 40, then the line 60 would be the upper limit of the critical surface region. However, if the upper side surface portion 58 made up less than one-quarter of the perimeter surface area, the critical surface region would extend below the side center line 60 to include an area within the inboard one-quarter portion of the total perimeter surface area of the nacelle rear portion 40.

To identify the critical surface region in the situation where the nacelle is mounted directly to the wing, as shown in FIGS. 3 through 6, but with the wing having a forward sweep, reference is now made to FIGS. 7 through 10, which show the nacelle mounted to a forward swept wing. The same numerical designations that were applied to the airplane of FIGS. 3 through 6 are applied to the airplane of FIGS. 7 through 10, with one exception. With the wing being forward swept instead of swept rearwardly (as in FIGS. 3 through 6), the portion of the wing 34 which sweeps forwardly from the location of the nacelle 36 is the outboard wing section, so this is designated 34a. The inboard wing section sweeps rearwardly from the nacelle 36, so this is designated 34b.

To identify the critical surface region of the nacelle of the forward swept wing of FIGS. 7 through 10, the same analysis is applied as that relative to FIGS. 3 through 6, except that these critical regions now become located on the outboard surface portions of the nacelle 36. Since this is readily apparent from an examination of the two sets of figures, FIGS. 3 through 6 and FIGS. 7 through 10, this same analysis will not be repeated with respect to FIGS. 7 through 10. However, it can be stated, generally, that the critical surface regions of the forward nacelle portion 38 become the outboard side surface 48, and generally the upper outboard surface portion 52. With respect to the configuration of FIG. 9, the surface portion 48a becomes a critical surface region. With regard to the nacelle configuration of FIG. 10, the surface portion 62 becomes a critical surface region, and possibly a surface portion below the outboard maximum diameter line 64.

With the "critical zone" and "critical surface region" being defined, we now proceed to a consideration of the "critical contour area". The "critical contour area" can be defined as that portion of the "critical surface region" which lies within the "critical zone".

The present invention is predicated upon the premise that in contouring the nacelle 36, the critical contour area of the nacelle 36 should be shaped in accordance with the streamlines generated by the airfoil 34, while the other surface portions of the nacelle 36 should be shaped to correspond to the functional and structural requirements of the engine contained in the nacelle 36. To apply this directly to the structure of the present invention, reference is now made to FIGS. 11, 12 and 13. In FIG. 11, there is shown in top plan view the wing 34 having a lower aerodynamic surface 66, a leading edge 68, and a trailing edge 70. The nacelle 36 is designed for a long duct fan jet engine having a mixed flow nozzle configuration. There is an inlet 72 defined by a leading edge 74 of the nacelle 36, and an exhaust nozzle 76 defined by the trailing edge 78 of the nacelle 36. The engine itself, designated 80, comprises a forward fan section 82, a core engine 84, and engine accessories 86. (The engine accessories are such things as hydraulic pumps, alternators, etc. that are driven from the engine 80.)

To a large extent, the general configuration of the nacelle 36 must be dictated by the functional and structural requirements of the engine 80. Considering the engine 80 itself, the core engine 84 and fan 82 must be sized to produce adequate thrust for the aircraft. This in turn dictates to a large extent the total cross-sectional area of the main central portion of the engine, indicated generally at 88.

The cross-sectional area of the inlet 72 is dictated mainly by the air requirements of the engine 80, and of course the inlet leading edge 74 must be contoured within reasonably narrow design limits to minimize drag and internal flow losses in the airstream flowing into and adjacent the inlet 72. Finally, the area of the nozzle opening 76 will be sized to maximize thrust generated by the exhaust gases exiting from the nozzle 76, and this in turn dictates the configuration of the trailing edge 78, which is relatively sharp to reduce drag that might otherwise be created at the aft end of the nacelle 36.

With regard to the structural requirements of the engine 80 and nacelle 36, when the engine 80 is mounted directly to the wing (i.e. without a pylon), quite commonly this is done by mounting the engine casing directly to a main forward spar of the wing. In FIG. 11, this main spar is indicated in broken lines at 90. Quite commonly, the engine casing is made up of two main lateral structural members indicated at 92, which extend from the casing 94 of the fan section 82 rearwardly to the front spar 90. For a number of reasons, these structural components 92 are arranged symmetrically and axially aligned with regard to a center axis 96 of the engine 80. Thus, these structural components 92 impose certain constraints on the shaping of the surrounding nacelle 36.

With most modern turbo fan engines, the overall configuration is such that the cross-sectional area at the trailing edge 78 is smaller than the cross-sectional area at the main engine structure 88, and also smaller than the cross-sectional area at the inlet 72. Also, the cross-sectional area of the main engine structure 88 is generally moderately larger than that at the inlet leading edge 74. For this reason, in a conventional design of an engine nacelle, with the nacelle surface symmetrically contoured, the outer surface of the nacelle will generally curve moderately in an expanding configuration from the inlet toward an intermediate portion of the nacelle, and then curve in a contracting configuration toward the exhaust end of the nacelle.

To relate these considerations to the present invention, attention is now directed to the streamlines of the air flowing about a swept airfoil. (For purposes of defining a "swept airfoil" in the present invention, a "swept airfoil" shall be considered an airfoil where the pressure isobars over the upper surface of the airfoil make an angle of at least ten degrees with the main air stream.) As the wing 34 passes through the air, the streamlines which approach the leading edge 68 will bend laterally in a direction corresponding to the sweep of the wing 34. With the wing 34 being swept rearwardly from the fuselage 32, the streamlines approaching the leading edge 68 will thus bend in an outboard direction. Also, the streamlines will diverge upwardly and downwardly, with some of the streamlines passing under the wing lower surface 66, and some passing above the wing 34.

With regard to the streamlines which pass beneath the airfoil lower surface 66, as these streamlines cross below the leading edge 68, they generally follow the contour of the lower surface 66. With respect to bending laterally, as the streamlines pass under the leading edge 68, the streamlines continue to turn outboard and curve moderately in an outboard direction under the forward portion of the wing surface 66. As these lower streamlines approach the trailing edge 70, they tend to straighten and follow the main stream of the airflow.

In contouring the nacelle 36, the "ideal" stream tube of the air flowing around the wing (i.e. those streamlines comprising a tube of a diameter approximately equal to the nacelle and occupying the position of the nacelle, which would be generated by the wing 34 with no aerodynamic interference from other objects) are first located. This can be done in any convenient manner well known to the aerodynamicist. For example, this could be done experimentally in a wind tunnel, or any number of analytical methods could be used.

Then, the "critical contour area" of the nacelle 36 is shaped to follow the contour of the ideal streamlines passing around the airfoil. After this, the "non-critical contour area" (i.e. the surface areas of the nacelle 36 other than the "critical contour area") is shaped to satisfy the overall configuration requirements of the nacelle 36 as dictated by the requirement of the engine 80.

To relate this specifically to the nacelle shown in FIGS. 11 through 13, let it be assumed that the nacelle 36 has an overall configuration such that the nacelle rear portion 40 has the general configuration illustrated in FIG. 11. With reference specifically to FIG. 11, there is shown a streamline 98 which passes adjacent a line 100 which is at the juncture line of the nacelle inboard side surface portion 46a and the wing upper surface 66. A substantial portion of the nacelle surface area adjacent the streamline 98 (extending both rearwardly and forwardly from the leading edge 68) lies within the critical contour area, and thus would follow the contour of the streamline 98. Accordingly, the inboard side surface 46 of the nacelle front portion 38 slants in a curve in an outboard direction until it reaches the leading edge 68. At the location of the leading edge 68, the side surface 46 extends below the wing lower surface 66 (this rear side surface portion being indicated in FIG. 11 at 46a), and in following the streamline 98 continues to curve from the leading edge 68 in an outboard direction. At a more rearward location along the inside surface 46a, the surface tends to curve more nearly toward the direction of the main stream flow. So that this curve in the steamline 98 can be seen more clearly, the direction of the main stream flow is indicated at 102 in FIG. 11.

Reference is now made to FIG. 13, where there is shown a second streamline 104 adjacent the upper center surface line 54 of the nacelle 36. As indicated previously, depending upon the precise location of the nacelle 36, this line 54 would be at the outer limit of, or possibly outside of, the critical surface region. However, it can be stated that generally the contour of the nacelle 36 at the location of the upper center surface line 54 would generally follow the contour of the streamline 103.

Reference is now made to FIG. 12 to disclose a rather interesting facet in the contouring of the upper inboard forward surface portion of the nacelle 36. The ideal streamlines which approach the wing 34 at the stagnation point of the leading edge 68 tend to deflect laterally to a relatively larger degree than the other streamlines, before splitting to pass above and below the wing 34. The effect of this is that the upper inboard surface portion of the front part 38 of the nacelle 36 has what might be termed an upward and inboard "bulge" or protrusion 104. The reason for this can be explained as follows. As can be seen in FIG. 11, the inboard contour of the front part 38 of the nacelle 36 at the location of the leading edge 68 extends furthest in an inboard direction, as indicated at 106 in FIG. 11. Since the nacelle surface at the location 106 is very close to the engine support structure 92, the nacelle at the location 106 must be relatively uniform in that it can not afford any substantial surface deviations relative to the engine support structure 92. Thus, if the streamlines in the critical contour area are projected forwardly from the surface location 106, the result is the outward deflection or protrusion 104 which extends along the upper inboard forward portion of the nacelle 36. This protrusion 104 makes a very convenient position to locate the aforementioned engine accessories 86, and these are indicated somewhat schematically at that particular location in FIG. 12.

Slight deviations from the ideal stream tube are permitted near the nozzle to divert the jet exhaust in a direction closely approximating that of the ideal stream tube.

To turn our attention now to the non-critical contour area of the nacelle 36, reference is again made to FIG. 11, wherein the outboard side surface portion 48 of the nacelle 36 is shown in plan view. It can be seen that this surface portion 48 slants from the leading edge 74 moderately in an outboard direction to the location of the fan section 82, and aft of that location begins a curve in an inboard and rearward direction to terminate at the nozzle trailing edge 78. As shown herein, at the location where the outboard surface area 48 crosses the leading edge 68, the nacelle surface 48 should be outside of the engine support structure 92. Thus in the particular configuration shown herein, the engine structure 92 dictates the general location of the contour of the outboard nacelle surface 48. The nacelle contours only generally conform to the ideal stream tube shape in this area, and greater deviation from the ideal stream tube is permitted.

With regard to the lower surface 42 of the nacelle 36, reference is made to FIG. 13, where it can be seen that this surface 42 curves in a contour which expands from the nacelle leading edge 74 to the location of the fan section 82, and then curves more toward the center axis 96 of the engine 80 to terminate at the nozzle trailing edge 78.

To employ the teachings of the present invention to a nacelle mounted to a forward swept wing, the nacelle would be shaped substantially the same as the nacelle 36 of FIGS. 11–13, except that the nacelle on the forward swept wing would be substantially a mirror image of the nacelle on the rear swept wing.

The reason for this is, of course, that the pattern of the streamline following under the forwardly swept wing 34' tend to be mirror images of the streamline passing under the rear swept wing of FIGS. 11 through 13. Since the details of this contouring of the nacelle on the forward swept wing are readily apparent from a review of the description with reference to FIGS. 11 through 13, a detailed description of that nacelle will not be given.

With regard to the contouring of the nacelle in the critical contour area, two criteria should be followed. First, there is the tolerance within which the critical contour area should follow the ideal stream sheet. (The ideal "stream sheet" is the sheet defined by the streamlines adjacent the critical contour area determined for the flow about the wing alone.) Second, there is the limitation on the surface curvature in the critical contour area.

Specification of the tolerances begins by defining three items:

a. "point of reference" is any point on the stream sheet in the critical contour area b. "most adjacent point" is any point on a nacelle nearest to the point of reference.

c. "cross sectional area" of the nacelle ($A_\pi$) is the frontal area of nacelle measured in a plane which contains the most adjacent point and is essentially perpendicular to the local stream direction.

The following tolerances can now be specified.

1. an alignment tolerance is given by the following formula, which provides an alignment tolerance value:

$$\frac{|h|}{\sqrt{\frac{A_\pi}{\pi}}} < 0.2$$

where:

"h" = the distance between point of reference and most adjacent point $A_\pi$ = cross sectional area of nacelle at most adjacent point.

2. the curvature tolerance is given by the following formula which provides a curvature tolerance value:

$$\left(\frac{M}{M_\infty}\right)^2 \left(\sqrt{\frac{A_\pi}{\pi}}\right) \left|\frac{1}{R_{S.S.}} - \frac{1}{R_N}\right| < 0.15$$

where:

M = Mach number on the stream sheet at the point of reference.

$M_\infty$ = free stream Mach number at infinity $R_{S.S.}$ = radius of curvature of stream sheet at point of reference.

$R_N$ = radius of curvature of nacelle or pylon at most adjacent point.

Final Definition:

The radius of curvature of either the stream sheet at the point of reference or of the nacelle at the most adjacent point is measured in a plane which contains the surface normal at the point and the local velocity vector at the point.

With respect to the alignment tolerance formula given above, current analysis indicates that 0.2 would be approximately the maximum tolerance value beyond which drag penalties become excessive. Desirably, the value should be no greater than 0.15, and for best results, it should be no greater than 0.1.

With regard to the curvature tolerance formula, the maximum curvature tolerance value beyond which the drag becomes excessive is approximately 0.15. Desirably, it would be no greater than approximately 0.1. The most preferred range would be no greater than about 0.05.

It is to be understood, of course, that the tolerances given by the above formulas were derived empirically from an analysis of test data. This data indicates that if the critical contour area is designed within these tolerances, drag penalties will be brought to a practical minimum. If the critical contour area departs substantially from the tolerances given by the above formulas, the penalties in the drag become more significant, and increase would be generally in a functional relationship related to the amount of deviation from the tolerances given by the above formulas.

What is claimed:

1. In an aircraft having a longitudinal axis and designed for flight at a predetermined design speed through a main airstream having a main flow direction, a combination of an airfoil, engine and engine nacelle, said combination comprising:
   (a) an airfoil having a leading edge, a trailing edge, and a lower aerodynamic surface, said airfoil having a predetermined (weeep) sweep angle of at least 10°, and having an outboard end and an inboard end,
   (b) a nacelle mounted directly adjacent to said airfoil at a location below and forwardly of said airfoil, said nacelle having a forward section extending forwardly of the leading edge and a rear section positioned rearwardly of the leading edge, said nacelle having an inboard side surface portion and an outboard side surface portion,
   (c) an engine mounted in said nacelle,
   (d) said airfoil being characterized in that in a situation where the airfoil would be passing in flight through said airstream at the design speed, but without aerodynamic interference from other objects in proximity thereto, said airfoil would create in said airstream an airstream flow pattern having a plurality of streamlines which approach the leading edge and pass under the airfoil, with the airfoil creating in said airstream flow pattern a critical zone, which zone includes a general area in said airstream flow proximate said airfoil, where at least one of the following conditions occur:
      1. a local pressure coefficient in said airstream flow has an absolute magnitude greater than 0.05,
      2. said airstream flow about said airfoil is supersonic,
   (e) said nacelle having a critical surface region which comprises the nacelle side surface portions adjacent an airfoil portion that sweeps laterally and forwardly from the nacelle,
   (f) said nacelle having a critical contour area which comprises an area where any portion of the critical surface region is within said critical zone,
   (g) the critical contour area of the nacelle being in substantial contour alignment with the streamlines immediately adjacent the critical contour area to thereby reduce interference between said nacelle and said airfoil, which streamlines form a stream sheet, said critical contour area having a forward portion forward of the leading edge and sloping rearwardly in a direction slanted from said main flow direction in a direction of rearward sweep of said airfoil, said critical contour area having a rear portion rearward of said leading edge sloping rearwardly in a direction from said main flow direction also in the direction of rearward sweep of the airfoil,
   (h) other nacelle surface portions which are not included in the critical contour area being collectively a non-critical contour area, said non-critical contour area having at least a substantial portion thereof shaped to conform to configuration requirements of said engine, with at least part of the substantial portion of the non-critical contour area departing from substantial contour alignment with adjacent streamlines.

2. The combination as recited in claim 1, wherein said nacelle has an inlet end, an outlet end and a main body portion intermediate the inlet and outlet ends, said outlet end having a cross sectional area smaller than that of the main body portion, at least a portion of the non-critical contour area being arranged to slope from said main body portion rearwardly to the outlet end on a slant toward a longitudinal center line of said nacelle.

3. The combination as recited in claim 2, wherein the critical contour area is aligned in such a manner that an alignment tolerance value is no greater than 0.2, said value being given by the following formula:

$$\frac{|h|}{\sqrt{\frac{A_\pi}{\pi}}} < \text{the alignment tolerance value}$$

where:
"h" = the distance between point of reference and most adjacent point,
$A_\pi$ = cross sectional area of nacelle at most adjacent point,
where the following definitions apply:
   a. said "point of reference" is any point on the stream sheet in the critical contour area,
   b. said "most adjacent point" is any point on the nacelle nearest to the point of reference,
   c. said $A_\pi$ is a frontal area of the nacelle measured in a plane which contains the most adjacent point and is perpendicular to free stream direction.

4. The combination as recited in claim 3, wherein the alignment tolerance value is no greater than about 0.15.

5. The combination as recited in claim 4, wherein the alignment tolerance value is no greater than about 0.1.

6. The combination as recited in claim 2, wherein curvature of the critical contour area is such that a contour tolerance value is no greater than 0.15, said value being given by the following formula:

$$\left(\frac{M}{M_\infty}\right)^2 \left(\sqrt{\frac{A_\pi}{\pi}}\right) \left| \frac{1}{R_{S.S.}} - \frac{1}{R_N} \right| < \text{Contour tolerance value}$$

where the following definitions apply:
M = Mach number on the stream sheet at a point of reference,
$M_{oo}$ = free stream Mach number at infinity,
$R_{S.S}$ = radius of curvature of stream sheet at the point of reference,
$R_N$ = radius of curavture of nacelle at a most adjacent point,
where the following definitions apply:
   a. said "point of reference" is any point on the stream sheet in the critical contour area, b. said "most adjacent point" is any point on the nacelle nearest to the point of reference, c. said $A_\pi$ is the frontal area of the nacelle measured in a plane which contains the most adjacent point and is essentially perpendicular to the free stream direction, where the radius of curvature of the stream sheet at the point of reference is measured in a plane which contains the surface normal at the point of reference and a local velocity vector at the point of reference, and the radius of curvature of the nacelle at the most adjacent point is measured in a plane which contains the surface normal at the most adjacent point and a local vector at the most adjacent point.

7. The combination as recited in claim 6, wherein the curvature tolerance value is no greater than about 0.1.

8. The combination as recited in claim 7, wherein the curvature tolerance value is no greater than about 0.05.

9. The combination as recited in claim 1, wherein:

(a) the critical contour area is aligned in a manner that an alignment tolerance value is no greater than 0.2, said value being given by the following formula:

$$\frac{|h|}{\sqrt{\frac{A_\pi}{\pi}}} < \text{the alignment tolerance value}$$

where:

"h" = the distance between point of reference and most adjacent point, $A_\pi$ = cross sectional area of nacelle at the most adjacent point, where the following definitions apply:

a. said "point of reference" is any point on the stream sheet in the "critical contour area", b. said "most adjacent point" is any point on the nacelle nearest to the point of reference, c. said $A_\pi$ is a frontal area of the nacelle measured in a plane which contains the most adjacent point and is perpendicular to free stream direction, (b) curvature of the critical contour area is such that a contour tolerance value is no greater than 0.15, said value being given by the following formula:

$$\left(\frac{M}{M_\infty}\right)^2 \left(\sqrt{\frac{A_\pi}{\pi}}\right) \left| \frac{1}{R_{S.S.}} - \right.$$

-continued $$\left. \frac{1}{R_N} \right| < \text{Contour tolerance value}$$

where the following definitions apply:

M = Mach number on the stream sheet at the point of reference, $M_{oo}$ = free stream Mach number at infinity, $R_{S.S.}$ = radius of curvature of stream sheet at said point of reference, $R_N$ = radius of curvature of nacelle at said most adjacent point, where the radius of curvature of the stream sheet at the point of reference is measured in a plane which contains the surface normal at the point of reference and a local velocity vector at the point of reference, and the radius of curvature of the nacelle at the most adjacent point is measured in a plane which contains the surface normal at the most adjacent point and a local vector at the most adjacent point.

10. The combination as recited in claim 9, wherein the alignment tolerance value is no greater than about 0.15, and the curvature tolerance value is no greater than about 0.1.

11. The combination as recited in claim 10, where in the alignment tolerance is no greater than about 0.1, and the curvature tolerance is no greater than bout 0.05.

12. The combination as recited in claim 1, wherein said engine comprises a turbo fan engine having a fan section and a core engine, with engine accessories adjacent said fan section, said engine accessories bei-ng located in said nacelle adjacent the forward portion of the critical contour area of the nacelle.

13. The combination as recited in claim 1, wherein said critical surface region further comprises an upper surface portion of said nacelle forward section, which upper surface portion is adjacent to the nacelle side surface portion which comprises the critical contour area.

14. The combination as recited in claim 1, wherein a rear part of said side surface portion which comprises the critical surface retion and is positioned above the wing include an area which is the larger of the following:

(a) that portion of the rear part of the side surface region which comprises a one-quarter perimeter portion of an entire circumference of the nacelle rear section (b) that portion of the rear part of the side surface portion which extends from the airfoil to a location of maximum horizontal diameter of the nacelle rear section.

* * * * *